(12) United States Patent
Starr

(10) Patent No.: US 8,863,529 B2
(45) Date of Patent: Oct. 21, 2014

(54) VARIABLE PRESSURE RATIO COMPRESSOR

(75) Inventor: Matthew J. Starr, Indianapolis, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 1227 days.

(21) Appl. No.: 12/650,878

(22) Filed: Dec. 31, 2009

(65) Prior Publication Data

US 2010/0223903 A1 Sep. 9, 2010

Related U.S. Application Data

(60) Provisional application No. 61/203,972, filed on Dec. 31, 2008.

(51) Int. Cl.
- *F02C 1/00* (2006.01)
- *F02C 6/04* (2006.01)
- *F02C 6/08* (2006.01)

(52) U.S. Cl.
USPC .................. 60/772; 60/782; 60/785

(58) Field of Classification Search
USPC ........... 60/204, 262, 266, 728, 782, 785, 805, 60/39.23, 806; 415/61, 78
See application file for complete search history.

(56) References Cited

U.S. PATENT DOCUMENTS

| | | | |
|---|---|---|---|
| 2,831,627 A | 4/1958 | Brunner | |
| 2,874,926 A | 2/1959 | Gaubatz | |
| 3,842,597 A | 10/1974 | Ehrich | |
| 3,901,026 A * | 8/1975 | Quinn | 60/792 |
| 4,522,024 A * | 6/1985 | Zaugg | 60/775 |
| 4,916,893 A * | 4/1990 | Rodgers | 60/785 |
| 5,623,823 A | 4/1997 | Schirle et al. | |
| 5,845,482 A * | 12/1998 | Carscallen | 60/785 |
| 6,158,210 A | 12/2000 | Orlando | |
| 6,739,120 B2 | 5/2004 | Moniz et al. | |
| 6,755,025 B2 | 6/2004 | Eleftheriou et al. | |
| 6,799,112 B1 | 9/2004 | Carter et al. | |

(Continued)

FOREIGN PATENT DOCUMENTS

| GB | 713436 | 8/1954 |
|---|---|---|
| GB | 2 118 248 A | 10/1983 |

OTHER PUBLICATIONS

International Search Report and Written Opinion, PCT/US2009/069920, Mar. 12, 2010, Rolls-Royce North American Technologies, Inc.

(Continued)

*Primary Examiner* — William H Rodriguez
*Assistant Examiner* — Arun Goyal
(74) *Attorney, Agent, or Firm* — Krieg DeVault LLP

(57) ABSTRACT

A compressor of a gas turbine engine may have a bypass that routes a compressed air flow from within the compressor and directs the compressed air flow to a combustor. The bypass may have an inlet positioned just ahead of a downstream stage of the compressor and an outlet positioned to route the compressed air flow from the bypass to a diffuser or directly to a combustor. A valve may be used within the bypass and may be located near the inlet, near the outlet, or both. The valve may have the form of an annular sleeve in some embodiments and may be actuated with an actuator. The various arrangements allow for a compressor having a variable compression ratio.

24 Claims, 4 Drawing Sheets

(56) References Cited

U.S. PATENT DOCUMENTS

| | | |
|---|---|---|
| 6,901,739 B2 | 6/2005 | Christopherson |
| 6,907,724 B2 | 6/2005 | Edelman et al. |
| 7,784,288 B2 * | 8/2010 | Thatcher et al. ............ 60/795 |
| 2004/0055310 A1 | 3/2004 | Mannarino |
| 2005/0178105 A1 | 8/2005 | Kawamoto et al. |
| 2005/0244269 A1 | 11/2005 | Loudet |
| 2005/0252194 A1 | 11/2005 | Orlando et al. |
| 2007/0204625 A1 | 9/2007 | Thatcher et al. |

OTHER PUBLICATIONS

Supplemental European Search Report and Opinion of the European Patent Office for EP09837199 dated Nov. 27, 2013, 9 pages.

* cited by examiner

VARIABLE PRESSURE RATIO COMPRESSOR

CROSS REFERENCE TO RELATED APPLICATIONS

The present application claims the benefit of U.S. Provisional Application No. 61/203,972, filed Dec. 31, 2008, and is incorporated herein by reference.

FIELD OF THE INVENTION

The present invention generally relates to gas turbine engines, and more particularly, but not exclusively, to axial compressors of gas turbine engines.

BACKGROUND

The efficiency and performance of gas turbine engines may vary according to the form of the gas turbine engine and the speed range within which the gas turbine engine is operated. A paradox may exist between highly efficient subsonic and supersonic engines with regard to overall pressure ratio (OPR). In particular, subsonic, high bypass ratio engines may have a relatively high OPR to minimize core size, while supersonic engines may have a relatively reduced OPR to limit compressor discharge temperature for material considerations. Unfortunately, some existing systems have various shortcomings relative to certain applications. Accordingly, there remains a need for further contributions in this area of technology.

SUMMARY

One embodiment of the present invention is a unique bypass configuration for gas turbine engines. Other embodiments include apparatuses, systems, devices, hardware, methods, and combinations for bypassing at least a portion of a compressor flow and delivering the bypassed flow to a combustor. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
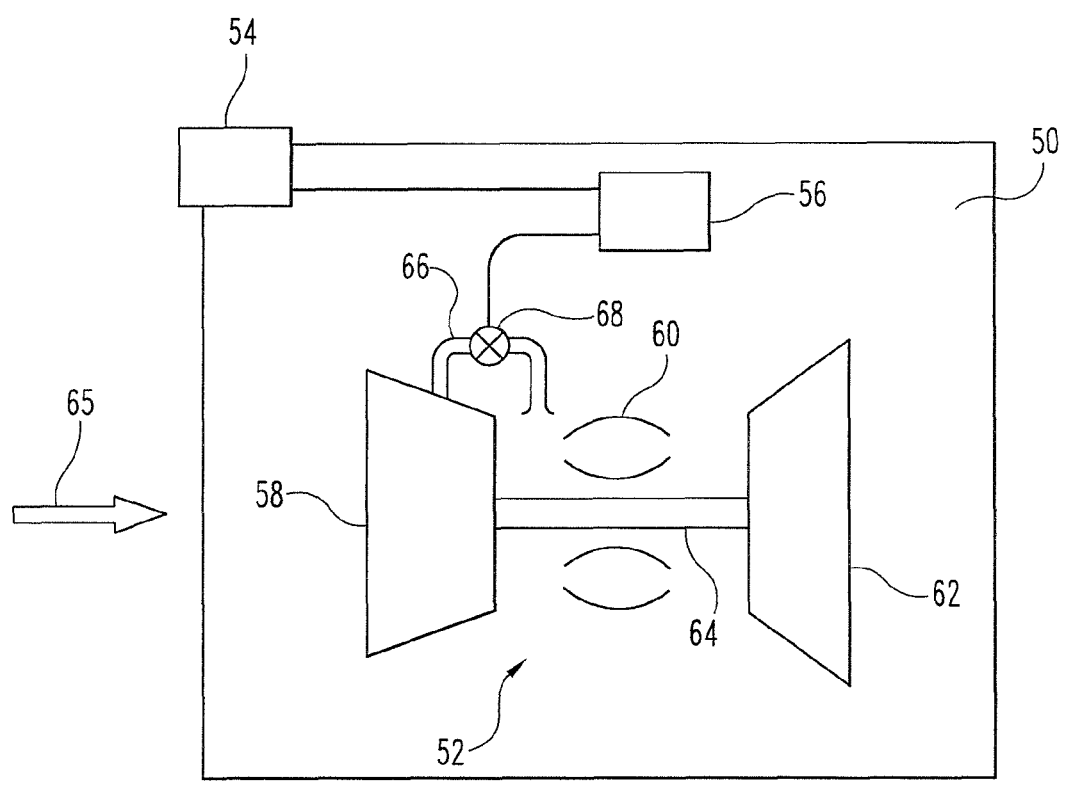
FIG. 1 is a schematic of a gas turbine engine having one embodiment of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a schematic is depicted of an aircraft 50 having a gas turbine engine 52, a flight condition sensor 54, and a controller 56. The aircraft 50 may take any variety of forms, including, but not limited to, helicopters, airplanes, unmanned space vehicles, fixed wing vehicles, variable wing vehicles, rotary wing vehicles, hover crafts, vehicles, and others. Further, the present inventions are contemplated for utilization in other applications that may not be coupled with an aircraft such as, for example, maritime propulsion and other applications known to one of ordinary skill in the art.

The gas turbine engine includes a compressor 58, combustor 60, and turbine 62. Airflow 65 entering the gas turbine engine 52 is compressed by compressor 58 before being mixed with fuel and burned in the combustor 60. The turbine 62 extracts work from a flow stream exiting the combustor 60 and uses that work to rotate a shaft 64. The shaft 64 is coupled between the compressor 58 and the turbine 62 such that work extracted by the turbine 62 is used to drive the compressor 58.

The gas turbine engine 52 is depicted as a turbojet engine in the illustrative embodiment, but may take on other forms in other embodiments such as, but not limited to, turbofans, turboshafts, and turboprops. In addition, the gas turbine engine 52 may also be integrated into a high speed propulsion system that may include a ramjet or scramjet. In some forms the gas turbine engine 52 may be operated as an adaptive or variable cycle engine. Furthermore, the gas turbine engine 52 may incorporate combustors such as pulse detonation combustors, wave rotor combustors, and others, to set forth just a few non-limiting examples. Yet further, the rotating turbomachinery such as the compressor and turbine may incorporate active tip clearance control and may have variable geometry. In short, the present inventions may be used in a variety of gas turbine engine forms.

The compressor 58 is an axial compressor in the illustrative embodiment. In some embodiments the compressor 58 may be a compressor that is part of a high pressure spool, intermediate pressure spool, or low pressure spool. In addition, the compressor 58 may have any number of stages (i.e. any number of pairs of compressor blade rows and vane rows). In some embodiments the compressor 58 may be coupled with a centrifugal compressor to form a hybrid compression system for the gas turbine engine 52.

Figure 2:
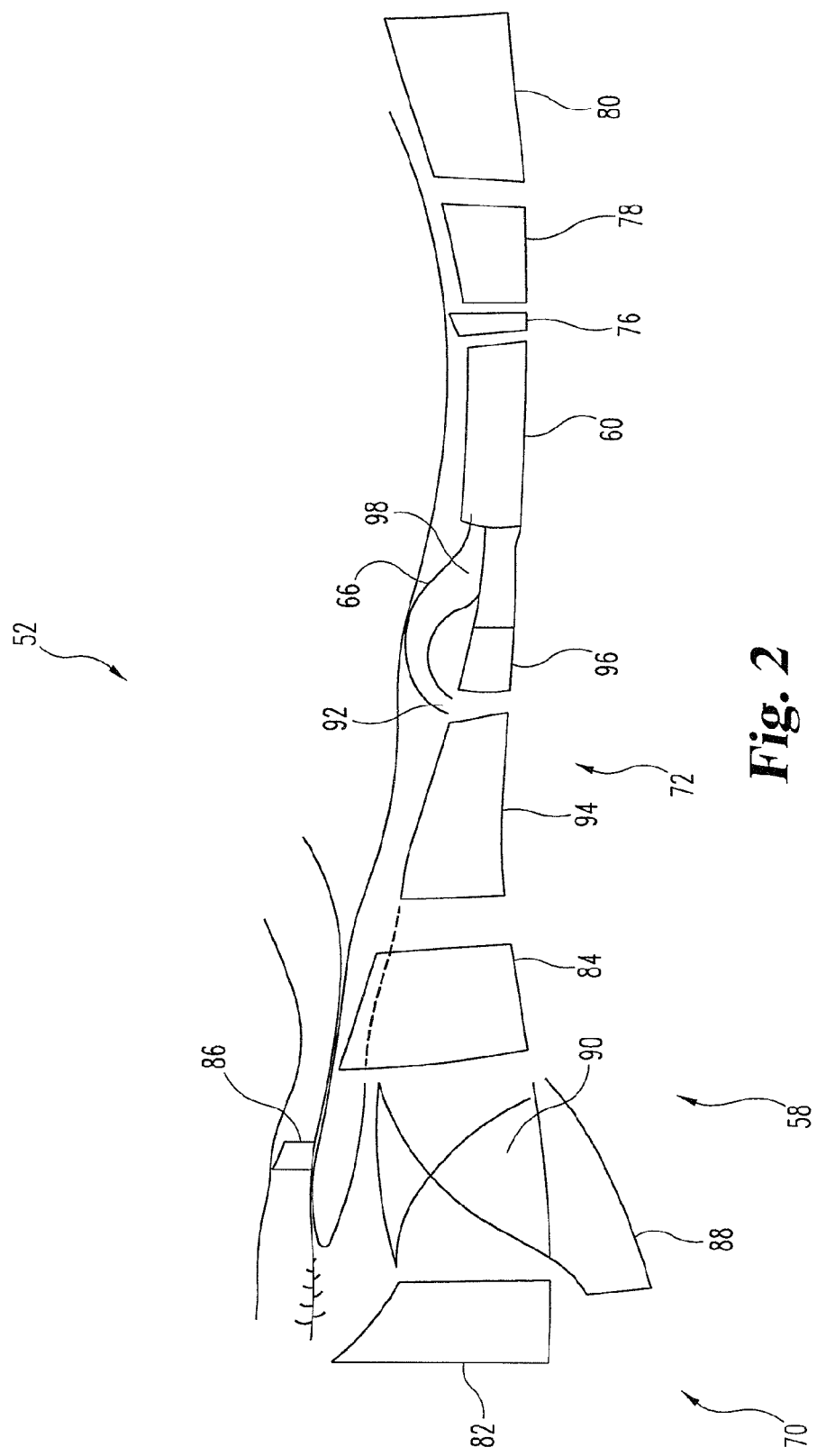
FIG. 2 is a schematic of a gas turbine engine having another embodiment of the present application.
Figure 3:
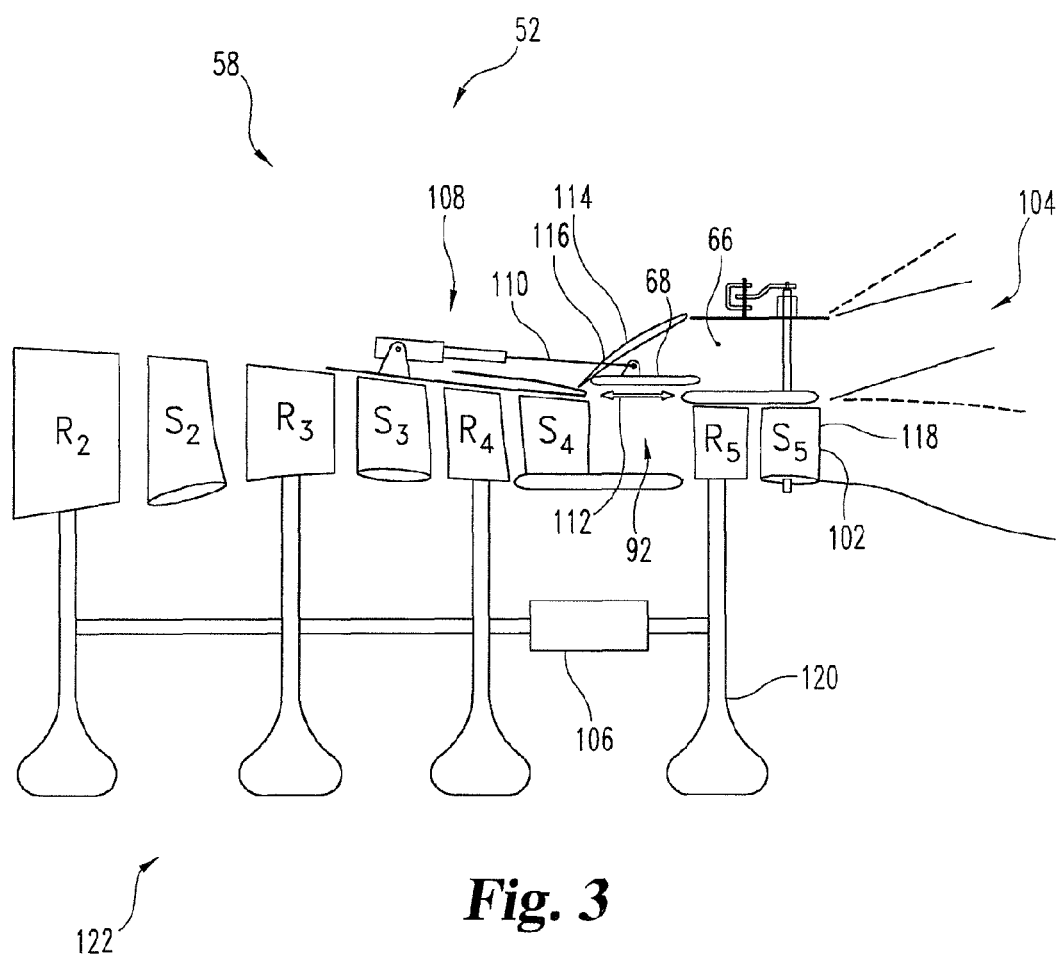
FIG. 3 is a schematic of a gas turbine engine having yet another embodiment of the present application.
Figure 4:
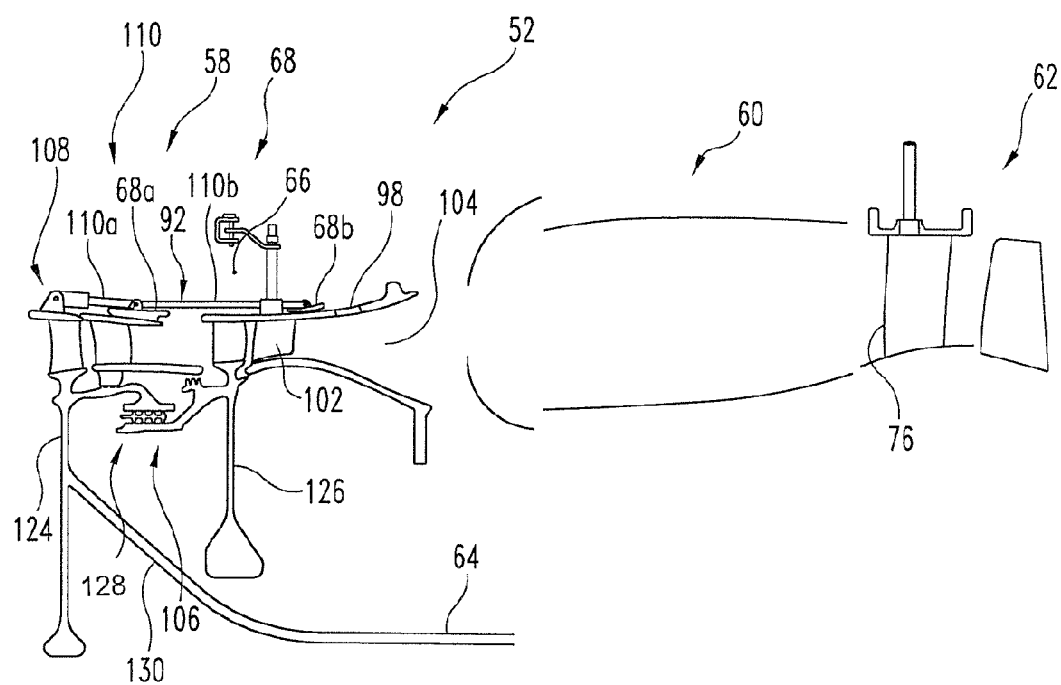
FIG. 4 is a schematic of a gas turbine engine having still another embodiment of the present application.

The gas turbine engine 52 also includes a compressor bypass 66 and valve 68 which are both discussed more fully in the description of FIGS. 2-4. In general, though, the compressor bypass 66 operates to bypass the compressor flow stream past at least one row of compressor blades and deliver the diverted compressor flow to the combustor, thus reducing the potential overall pressure ratio of the compressor. In some applications the compressor bypass 66 can flow the compressor flow stream at various flight conditions to modulate/change/regulate the overall pressure ratio of the gas turbine engine 52. The diverted compressor flow delivered to the combustor can be mixed with fuel and combusted, among other possible uses within the combustor. To set forth just one non-limiting example, the diverted compressor flow can also be used as a cooling flow within the combustor. The valve 68 has an open and closed position and is used to allow compressed air to flow through the bypass 66. When the valve 68 is in the open position, compressed air from the compressor may be diverted away from any downstream row of compressor blades and through the bypass 66.

The flight condition sensor 54 measures aircraft flight condition such as speed and altitude, to set forth just two non-limiting examples, and may output any variety of data whether sensed or calculated. For example, the flight condition sensor 54 may sense and output conditions such as static temperature, static pressure, total temperature, and/or total pressure, among possible others. In addition, the flight condition sensor 54 may output calculated values such as, but not limited to, equivalent airspeed, altitude, and Mach number. Any number of other sensed conditions or calculated values may also be output. The flight condition sensor 54 provides data to the controller 56 and may output values in either analog or digital form.

The controller 56 is typically positioned in an avionics bay and may be a single component, or a collection of operatively coupled components. Controller 56 may be comprised of digital circuitry, analog circuitry, or a hybrid combination of both of these types. Also, controller 56 may be programmable, an integrated state machine, or a hybrid combination thereof. Controller 56 may include one or more Arithmetic Logic Units (ALUs), Central Processing Units (CPUs), memories, limiters, conditioners, filters, format converters, or the like which are not shown to preserve clarity. In one form, controller 56 is of a programmable variety that executes algorithms and processes data in accordance with operating logic that is defined by programming instructions (such as software or firmware). Alternatively or additionally, operating logic for controller 56 can be at least partially defined by hardwired logic or other hardware. In one particular form, the controller 56 is configured to operate as a Full Authority Digital Engine Control (FADEC); however, in other embodiments it may be organized/configured in a different manner as would occur to those skilled in the art. It should be appreciated that controller 56 may be exclusively dedicated to control of valve 68, or may further be used in the regulation/control/activation of one or more other subsystems or aspects of aircraft 50 or gas turbine engine 52.

Turning now to FIG. 2, a schematic of one form of the gas turbine engine 52 is shown which depicts the compressor 58 having a low pressure (LP) fan system 70, a high pressure compressor (HPC) 72, the combustor 60, a turbine inlet guide vane 76, a high pressure turbine (HPT) 78, and a low pressure turbine (LPT) 80. An LP fan system 70 may be used in a relatively low speed regime and a relatively high speed regime and includes LP fans 82, 84, and 86, as well as an auxiliary inlet 88 and a diverter valve 90. An auxiliary inlet 88 and diverter valve 90 may be used to bypass air from LP fan 82, which may be used at relatively low speeds, to the LP fan 84, which may be used at relatively high speeds. The LP fan 86 may also be used at relatively high speeds to increase the effective mass flow during high Mach number flight.

The bypass 66 may be configured to flow a compressed air flow from the compressor 58 at a variety of flow rates, temperatures, and pressures and deliver the compressed air flow to a combustor 60. Although the bypass 66 is depicted as extending between the high pressure compressor 72 and the combustor 60 the bypass may extend from other compressors, whether high pressure, low pressure, or intermediate pressure compressor. Additionally, although only the single bypass 66 is depicted, some embodiments may have more than one bypass 66 configured to flow from the compressor 58 to a combustor. To set forth just one non-limiting example, the bypass 66 may include multiple bypass tubes. In some embodiments a compressor bleed may be provided in the bypass 66 to withdraw at least a portion of a compressed air flow that is flowing through the bypass 66. The bypass 66 may be made of sheet metal construction, but in some embodiments it may be incorporated into a compressor housing or other gas turbine engine 52 structure.

The bypass 66 is depicted having an inlet 92 disposed intermediate an upstream end and a downstream end of the HPC 72. Specifically, the inlet 92 is disposed between upstream stages 94 and downstream stages 96 of the HPC 72. In one form, the HPC 72 is a six stage compressor and the upstream stages 94 include stages 1-5 while the downstream stages 96 include stage 6. Other variations in the split in stages are contemplated herein. The inlet 92 may reside in the tip region of the HPC 72, and in some embodiments may be configured to extend into a flowpath of the HPC 72 if desired. For example, the inlet 92 may be formed as a scoop in some embodiments that extends partially or fully into the flowpath of the HPC 72 toward the hub region of the HPC 72. The inlet 92 may extend circumferentially around the gas turbine engine 52, or may be broken into one or more segments.

The bypass 66 also includes an outlet 98 that may provide a compressed air flow to the combustor 60. In some embodiments described further hereinbelow, the bypass 66 delivers compressed air flow to a diffuser. The outlet may extend circumferentially around the gas turbine engine 52, or may be broken into one or more segments.

The turbine inlet guide vane 76 is variable and may be used when compressed air is flowing through bypass 66.

Turning now to FIG. 3, a partial cross sectional view of one form of the gas turbine engine 52 is shown having the compressor 58, the bypass 66, the valve 68, a variable vane 102, a diffuser 104, and a clutch 106. The compressor 58 includes five stages, but only stages 2-5 are depicted in the figure. As will be appreciated, R2 represents the second stage rotor and S2 represents the second stage vane. Likewise, R3 and S3 represent the third stage rotor and vane and so on.

The valve 68 is arranged upstream from at least one blade row of the compressor 58. In the embodiment depicted in FIG. 3, the valve is arranged downstream of the compressor 58 fourth stage and upstream from the compressor 58 fifth stage. Specifically, FIG. 3 depicts the valve located downstream of the fourth stage vane and upstream of the fifth stage rotor, but in some embodiments the valve may be located immediately downstream of a rotor or immediately upstream of a stage. The valve 68 may be slidingly moved from a closed position to an open position to permit compressed air from the compressor 58 to enter the bypass 66. In the closed position the valve may permit leakage of some amount of compressed air flow into the bypass 66. In addition to the open and closed position, the valve 68 may also be moved to any intermediate position between the open and closed position. The closed position of the valve 68 is located upstream of the open position, but in some forms, however, the open position of the valve 68 may be located upstream of the closed position. The valve 68 may be a single annular sleeve surrounding a tip portion of the compressor 58, but in some forms it may be segmented such that multiple valves 68 are used to open and close the bypass 66. The valve 68 may also take on other forms such as a door or doors, one or more pivoting valves, flapper valves, and circumferentially sliding valves, to set forth just a few non-limiting examples. The valve 68 may be moved between an open position and a closed position by an actuator 108.

The actuator 108 may be a linear actuator capable of moving a rod 110 axially, but in other forms the actuator 106 may be a rotary actuator, to set forth just one possible alternative. In addition, the actuator 108 may take on any variety of forms such as, but not limited to, electrical, hydraulic, and pneumatic. The actuator 108 may be controlled by a controller, such as controller 56 depicted in FIG. 1, or may be operated manually. The actuator 108 may be capable of generating a variety of positions at a variety of slew rates.

The bypass 66 has the inlet 92 situated between the fourth stage and fifth stage of the compressor 58. A gap 112 exists between the upstream stages 1-4 and the downstream stage 5 of the compressor 58 and may be any size suitable to pass compressed air at a variety of temperatures, pressures, and flow rates. The inlet 92 may span between, for example, the stator S4 and blade R5, and in some forms may extend at least partially upstream of S4 and/or extend partially downstream of R5. In some forms the inlet may be formed between an upstream blade and a downstream vane, in which case the inlet may extend at least partially upstream of the blade and/or partially downstream of the vane. Still further forms may have an inlet that only partially spans between airfoil shaped devices such as the blades and vanes. Thus, any variety of positions of inlet 92 are contemplated herein. The bypass 66 includes a wall 114 through which may pass the rod 110. In some forms the wall 114 and/or rod 110 may have a piston ring 116 that may be used to provide a seal. Other types of seals may be used and are contemplated herein.

The variable vane 102 may be rotated to a closed position such that a compressed airflow may be partially or totally restricted from passing through the downstream stage or stages of the compressor 58. In some forms the variable vane 102 is used during high speed flight. Other types of devices may also be used to provide for a restriction of compressed air through the downstream stage or stages of the compressor 58. For example, a deployable barrier or barriers may be used at an outlet 118 of the compressor 58 as opposed to the variable vane 102. The deployable barrier or barriers may also be located elsewhere, such as just upstream of R5 or similar blade row located downstream of the bypass 66. The variable vane 102 may be an outlet guide vane in some forms. The variable vane 102 need not be used in some embodiments of the present inventions.

In those embodiments having the bypass 66 configured to bypass multiple downstream stages, the stator vanes of the downstream, bypassed stages may be made variable. For example, if stages 6 and 7 of the multi-stage compressor 58 were bypassed, the vane rows just downstream of each of the blade rows of the sixth and seventh stages may be made variable much like variable vane 102. Both sets of vane rows in the sixth and seventh stages, therefore, may be made to close thus inhibiting and/or preventing compressed air flow to flow through the downstream portion of the compressor 58 and instead be routed through the bypass 66. Though more than one stage may be bypassed, however, not all vane rows of the bypassed stages need be variable. To continue with the non-limiting example, the seventh stage may have a row of variable vanes used to restrict or block off a flow, but the sixth stage may only have fixed stator vanes. Other variations of which rows of the downstream, bypassed stages are variable and which are fixed are also contemplated herein.

The diffuser 104 receives compressed air flow from the compressor 58 whether the airflow is routed through the downstream stages, such as the fifth stage in the illustrated embodiment, or through the bypass 66. The diffuser may act to decelerate the compressed air flow and increase static pressure, among other possible uses. In some forms of the present inventions the diffuser 104 may not be present. The diffuser may include a low speed diffuser and a high speed diffuser. The solid and dashed lines represent various configurations for a diffuser that receives compressed air from the compressor 58 or the bypass 66.

A clutch 106 may be used to selectively engage a downstream rotor, which is depicted as the fifth rotor 120 in FIG. 3, to the upstream rotors, which are depicted generally as upstream rotors 122 in FIG. 3. It will be appreciated that in other embodiments the clutch may be used to selectively engage one or more downstream rotors to one or more upstream rotors, whether or not the arrangement is similar to that depicted in FIG. 3. The clutch 106 may include any number of friction plates, either input or output, and may be activated through a variety of techniques including hydraulic or electromagnetic, to set forth just a few non-limiting examples. The clutch 106 need not be used in some embodiments of the present inventions.

Turning now to FIG. 4, a partial cross sectional view of one form of the gas turbine engine 52 is shown having the compressor 58, the bypass 66, the valve 68, the variable vane 102, and the clutch 106. The compressor 58 includes an upstream rotor 124 and a downstream rotor 126 coupled through a clutch 106 and bearing pack 128. Though only a single upstream stage and a single downstream stage are shown in FIG. 4, it will be appreciated that more than one stage may be provided for either or both of the upstream and downstream sections of the compressor depicted. The upstream rotor 124 is coupled via drive arm 130 to the shaft 64 that may be driven by a turbine section of the gas turbine engine 52. The shaft 64 may be driven by other work producing devices besides a turbine section. When desired, the downstream rotor 126 may be selectively decoupled from the upstream rotor through the clutch 106 and allowed to windmill to a slower speed or to a complete stop. In some embodiments a brake may be provided to completely halt or impede further motion of the downstream rotor 126 when decoupled from the upstream rotor 124.

The valve 68 may include a valve 68a used to permit compressed air from the compressor 58 to be received within the bypass 66 through inlet 92, and a valve 68b used to route the compressed air to the diffuser 104 through outlet 98. A rod 110a extends from the actuator 108 and is used to move the valve 68a, while another rod 110b extends from the valve 68a and is coupled with the valve 68b. Movement of the actuator 108, therefore, produces movement in the valves 68a and 68b through respective rods 110a and 110b. While the rod 110b is depicted extending from valve 68a, in some forms the rod 110 may extend directly from the actuator 108. In other forms, another actuator may be used to supplement actuator 108 to drive rod 110b and thus valve 68b. The actuator 108, valves 68a and 68b, along with rods 110a and 110b may take on any variety of forms, some alternatives of which were described hereinabove. The valves 68a and 68b may be opened and closed simultaneously, or may be open and closed at different times or even independently of one another.

In one aspect of the present application an apparatus includes a gas turbine engine having a compressor and a compressor bypass, the compressor bypass operable to convey a flow stream from the compressor, and a combustor disposed downstream of the compressor within the gas turbine engine, the combustor in fluid communication with the compressor bypass.

One feature of the present application provides wherein the gas turbine engine includes a first pressure spool and a second pressure spool, the first pressure spool at a lower operating pressure than the second pressure spool, at least one of a first pressure compressor or second pressure compressor having several compressor blade rows, the compressor bypass operable to extract the flow stream upstream from at least one of the several compressor blade rows.

Another feature of the present application provides wherein the compressor bypass includes an inlet at least partially downstream of a vane and at least partially upstream of a rotating blade.

Still another feature of the present application provides a compressor outlet guide vane row operable to be rotated to a closed position, the compressor outlet guide vane row rotated to the closed position when the compressor bypass conveys the flow stream from the compressor.

A still further feature of the present application provides a diffuser operable to receive the portion of the compressor flow stream, the diffuser including a high Mach diffuser position and a low Mach diffuser position, the high Mach diffuser position operable to convey the portion of the compressor flow stream Yet a still further feature of the present application provides a variable turbine nozzle having a variety of positions dependent on a mass flow rate through the compressor bypass.

Still a further feature of the present application provides a shaft coupled between a turbine and the compressor, the compressor having a plurality of stages, and a clutch mechanism operable to selectively engage at least one blade row of the plurality of compressor stages to the shaft.

Yet another feature of the present application provides wherein the clutch mechanism is operable to selectively engage only the last blade row of the plurality of compressor stages.

Still yet another feature of the present application provides having a mode of operation characterized by selective disengagement of the at least one blade row of the compressor and selective extraction of the portion of the compressor flow stream.

In another aspect of the present application an apparatus includes a gas turbine engine having a compressor and a combustor, a bypass valve disposed within the gas turbine engine having an open position and a closed position, the bypass valve operable to withdraw a portion of a flow stream when in the open position, the portion of the flow stream originating upstream from at least one row of compressor blades; and a duct in fluid communication with the compressor and the combustor, the duct extending downstream from the bypass valve.

A feature of the present application provides a turbine nozzle operable to be rotated between a first position and a second position, the turbine nozzle and the bypass valve actuated in response to a change in state of the gas turbine engine.

Another feature of the present application provides an actuator and a valve arm, the actuator operable to translatingly drive the valve arm, the valve arm coupled with the bypass valve, wherein the valve arm is coupled with a piston ring to provide a seal.

Still another feature of the present application provides wherein the bypass valve is slidingly translated from the closed position to the open position, the closed position located upstream of the open position.

Yet another feature of the present application provides a combustor valve coupled with the bypass valve, the combustor valve operable to be slidingly translated from an open combustor valve position to a closed combustor valve position.

Yet still another feature of the present application provides wherein the combustor valve admits a flow stream to a diffuser when in the open combustor valve position.

A still further feature of the present application provides wherein the diffuser is a variable diffuser operable to accept flow from the compressor or duct, the variable diffuser capable of accepting a first speed flow from the compressor and a second speed flow from the duct, the first speed flow related to the gas turbine engine operating at a first Mach number, the second speed flow related to the gas turbine engine operating at a second Mach number, the first Mach number lower than the second Mach number.

A still yet further feature of the present application provides an aircraft having the apparatus, the aircraft including a controller operable to command the bypass valve in response to a flight condition.

In yet another aspect of the present application an apparatus includes a gas turbine engine compressor operable to provide compressed air to a gas turbine engine combustor located at a downstream position, and means for diverting at least a portion of the compressed air from at least a portion of the compressor and delivering the portion of compressed air to the combustor.

In still another aspect of the present application a method includes opening a valve provided in a tip region of a gas turbine engine compressor, flowing a compressor flow stream through a passageway that bypasses a downstream blade row of the compressor, and delivering the compressor flow stream to a combustor.

One feature of the present application provides wherein the opening includes sliding an annular sleeve from a closed position to an open position.

Another feature of the present application provides diffusing the compressor flow stream prior to delivering to the combustor.

Yet another feature of the present application provides wherein the opening includes positioning a combustor valve to accept the compressor flow stream.

Yet still another feature of the present application provides wherein the opening includes closing a compressor outlet guide vane.

A further feature of the present application provides wherein the opening includes determining a speed of an aircraft having the gas turbine engine.

Another aspect of the present application provides an apparatus comprising a gas turbine engine having a compressor and a compressor bypass, the compressor bypass operable to convey a flow stream from the compressor, and a combustor disposed downstream of the compressor within the gas turbine engine, the combustor operable to combust a mixture of fuel and the flow stream received from the compressor bypass.

Still another aspect of the present application provides an apparatus comprising a gas turbine engine having a compressor and a combustor, a bypass valve disposed within the gas turbine engine having an open position and a closed position, the bypass valve operable to withdraw a portion of a flow stream when in the open position, the portion of the flow stream originating upstream from at least one row of rotatable compressor blades, and a duct in fluid communication with the compressor and the combustor, the duct extending downstream from the bypass valve and operable to deliver the portion to the combustor to be mixed with a fuel.

Yet still another aspect of the present application provides a method comprising opening a valve provided in a gas turbine engine compressor, flowing a compressor flow stream through a passageway that bypasses a downstream blade row of the compressor, and delivering a mixture of the compressor flow stream and a fuel to be combusted within a combustor.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a gas turbine engine having a spool compressor in the form of a multi-stage compressor and driven by a spool shaft, the gas turbine engine also having a compressor bypass that includes a bypass valve, the compressor bypass operable to convey a flow stream from a downstream stage of the multi-stage compressor;
a combustor disposed downstream of the compressor within the gas turbine engine, the combustor operable to combust a mixture of fuel and a flow from the spool compressor; and
an inter-stage clutch mechanism structured to selectively engage an upstream blade row of the multi-stage compressor to a downstream blade row of the multi-stage compressor, wherein the upstream blade row mechanically rotates the downstream blade row when engaged by the inter-stage clutch, and wherein the upstream blade row is rotatably independent of the downstream blade row when disengaged by the inter-stage clutch;
wherein the combustor receives the flow stream from the compressor bypass when the inter-stage clutch mechanism is disengaged, wherein the flow from the spool compressor is the flow stream; and
wherein the combustor receives the flow from the spool compressor that has passed through the downstream blade row when the inter-stage clutch mechanism is engaged.

2. The apparatus of claim 1, wherein the gas turbine engine includes a first pressure spool and a second pressure spool, the second pressure spool having the spool compressor, the multi-stage compressor including an intermediate blade row disposed between the upstream and the downstream blade rows, and the compressor bypass operable to extract the flow stream upstream from the intermediate and the downstream blade rows.

3. The apparatus of claim 1, wherein the compressor bypass includes an inlet at least partially downstream of a vane and at least partially upstream of a rotating blade.

4. The apparatus of claim 1, which further includes a compressor outlet guide vane row operable to be rotated to a closed position, the compressor outlet guide vane row rotated to the closed position when the compressor bypass conveys the flow stream from the multi-stage compressor.

5. The apparatus of claim 4, which further includes a diffuser operable to receive the portion of the compressor flow stream, the diffuser including a high Mach diffuser position and a low Mach diffuser position, the high Mach diffuser position operable to convey the portion of the flow stream.

6. The apparatus of claim 1, which further includes a variable turbine nozzle having a variety of positions dependent on a mass flow rate through the compressor bypass.

7. The apparatus of claim 1, wherein the spool shaft couples a turbine to the multi-stage compressor.

8. The apparatus of claim 7, wherein the inter-stage clutch mechanism is operable to selectively engage only the downstream blade row of multi-stage compressor.

9. The apparatus of claim 7, having a mode of operation characterized by selective disengagement of the at least one blade row of the compressor and selective extraction of the flow stream.

10. The apparatus of claim 1, which further includes a controller structured to operate the inter-stage clutch mechanism to engage and disengage the upstream blade row and the downstream blade row so as to effect a change in overall pressure ratio (OPR) depending on whether the upstream blade row is engaged or disengaged with the downstream blade row.

11. An apparatus comprising:
a gas turbine engine having a spool compressor in the form of a multi-stage compressor driven by a spool shaft, the multi-stage compressor including a plurality of rows of rotatable compressor blades, the gas turbine engine also having a combustor operable to receive a flow from the spool compressor;
a bypass valve disposed within the gas turbine engine having an open position and a closed position, the bypass valve operable to withdraw a portion of a flow stream when in the open position, the portion of the flow stream originating upstream from at least one row of the rotatable compressor blades;
a duct in fluid communication with the multi-stage compressor and the combustor, the duct extending from the bypass valve and operable to deliver the portion to the combustor to be mixed with a fuel; and
an inter-stage clutch mechanism operable to selectively rotatably couple an upstream stage blade row of the multi-stage compressor to downstream stage blade row of the multi-stage compressor, wherein the upstream stage blade row mechanically rotates the downstream stage blade row when rotatably coupled by the inter-stage clutch, and wherein the upstream stage blade row is rotatably independent of the downstream stage blade row when rotatably decoupled by the inter-stage clutch;
wherein the combustor receives the portion of the flow stream from the bypass valve when the inter-stage clutch mechanism is disengaged, wherein the flow from the spool compressor includes the portion of the flow stream; and
wherein the combustor receives the flow from the spool compressor that has passed through the downstream stage blade row when the inter-stage clutch mechanism is engaged.

12. The apparatus of claim 11, which further includes a turbine nozzle operable to be rotated between a first position and a second position, the turbine nozzle and the bypass valve actuated in response to a change in state of the gas turbine engine.

13. The apparatus of claim 11, which further includes an actuator and a valve arm, the actuator operable to translatingly drive the valve arm, the valve arm coupled with the bypass valve, wherein the valve arm is coupled with a piston ring to provide a seal.

14. The apparatus of claim 11, wherein the bypass valve is slidingly translated from the closed position to the open position, the closed position located upstream of the open position.

15. The apparatus of claim 11, wherein the diffuser is a variable diffuser operable to accept flow from the compressor or duct, the variable diffuser capable of accepting a first speed flow from the compressor and a second speed flow from the duct, the first speed flow related to the gas turbine engine operating at a first Mach number, the second speed flow related to the gas turbine engine operating at a second Mach number, the first Mach number lower than the second Mach number.

16. The apparatus of claim 11, which further includes an aircraft having the apparatus, the aircraft including a controller operable to command the bypass valve in response to a flight condition.

17. The apparatus of claim 11, which further includes a controller in control communication with the inter-stage clutch, the multi-stage compressor producing a first overall pressure ratio when the controller controls the inter-stage clutch to rotatably couple the upstream stage blade row to the downstream stage blade row, the multi-stage compressor producing a second overall pressure ratio when the controller controls the inter-stage clutch to rotatably decouple the upstream stage blade row from the downstream stage blade row, wherein the first overall pressure ratio is different than the second overall pressure ratio.

18. An apparatus comprising:
a gas turbine engine multi-stage compressor driven by a shaft and operable to provide compressed air to a gas turbine engine combustor located at a downstream position;
means for diverting at least a portion of the compressed air from at least a portion of the multi-stage compressor and delivering the portion of compressed air to the combustor, the means for diverting includes a bypass valve in fluid communication with the multi-stage compressor; and
an inter-stage clutch mechanism operable to selectively rotatably engage an upstream blade row of the multi-stage compressor to a downstream blade row of the multi-stage compressor, wherein the upstream blade row mechanically rotates the downstream blade row when rotatably engaged by the inter-stage clutch, and wherein the upstream blade row is rotatably independent of the downstream blade row when not rotatably engaged by the inter-stage clutch;
wherein the combustor receives the at least a portion of the compressed air from the bypass valve when the inter-stage clutch mechanism is disengaged; and
wherein the combustor receives the compressed air that has passed through the downstream blade row when the inter-stage clutch mechanism is engaged.

19. A method comprising:
opening a bypass valve provided in a gas turbine engine spool compressor, the gas turbine engine spool compressor being a multi-stage compressor driven by a spool shaft that includes an upstream stage blade row and a downstream stage blade row and operable to produce a spool compressor flow stream;
as a result of the opening a bypass valve, flowing a compressor flow stream through a passageway that bypasses the downstream stage blade row of the compressor; and
delivering a mixture of the compressor flow stream and a fuel to be combusted within a combustor;
mechanically disengaging the upstream stage blade row from the downstream stage blade row thereby reducing overall pressure ratio, wherein the combustor receives the spool compressor flow stream in the form of the compressor flow stream from the bypass valve when the upstream stage blade row is disengaged from the downstream stage blade row, and wherein the combustor receives the spool compressor flow stream that has passed through the downstream blade row when it is engaged to the upstream stage blade row.

20. The method of claim 19, wherein the opening includes sliding an annular sleeve from a closed position to an open position.

21. The method of claim 19, which further includes diffusing the compressor flow stream prior to delivering to the combustor.

22. The method of claim 19, wherein the opening includes positioning a combustor valve to accept the compressor flow stream.

23. The method of claim 22, wherein the opening includes closing a compressor outlet guide vane.

24. The method of claim 19, wherein the opening includes determining a speed of an aircraft having the gas turbine engine.

* * * * *